United States Patent Office 3,151,878
Patented Oct. 6, 1964

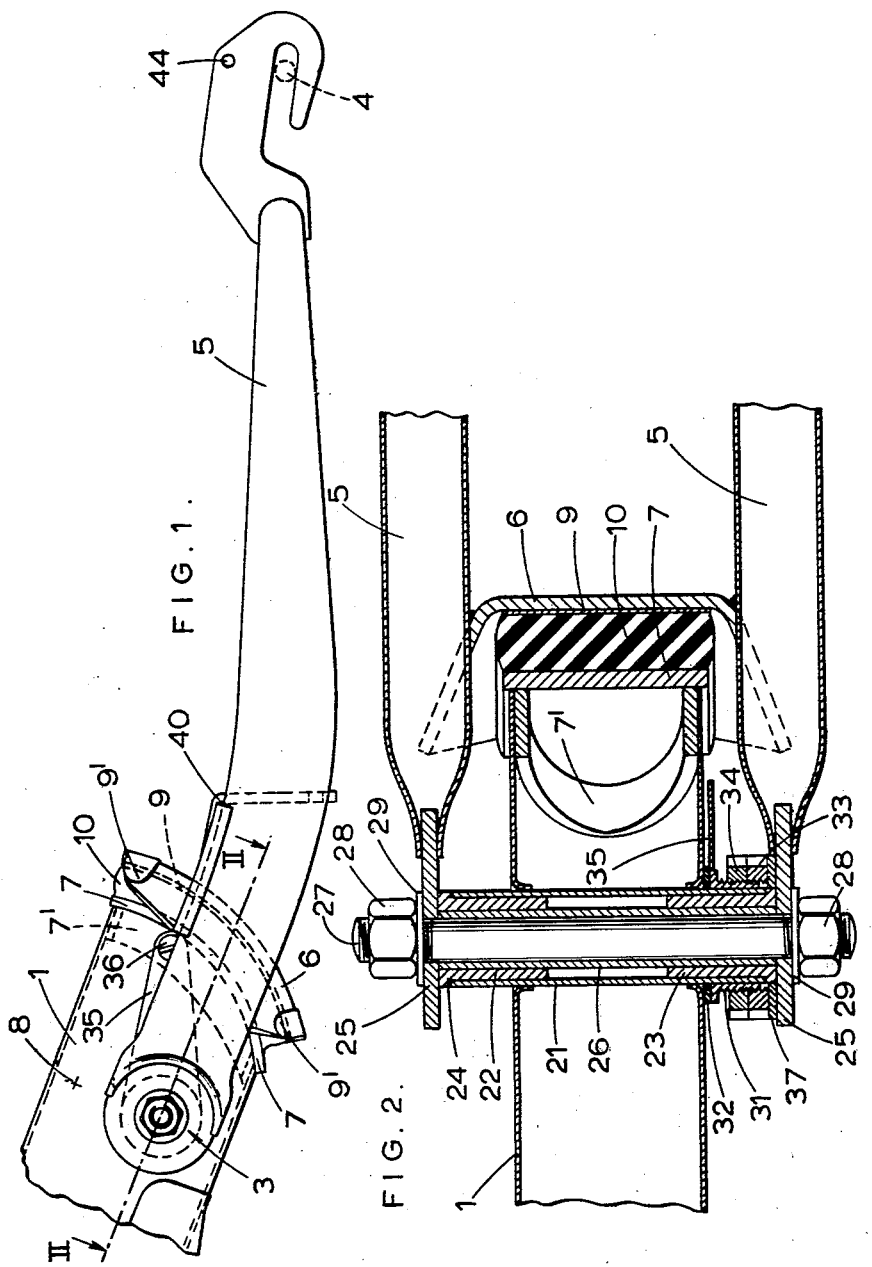

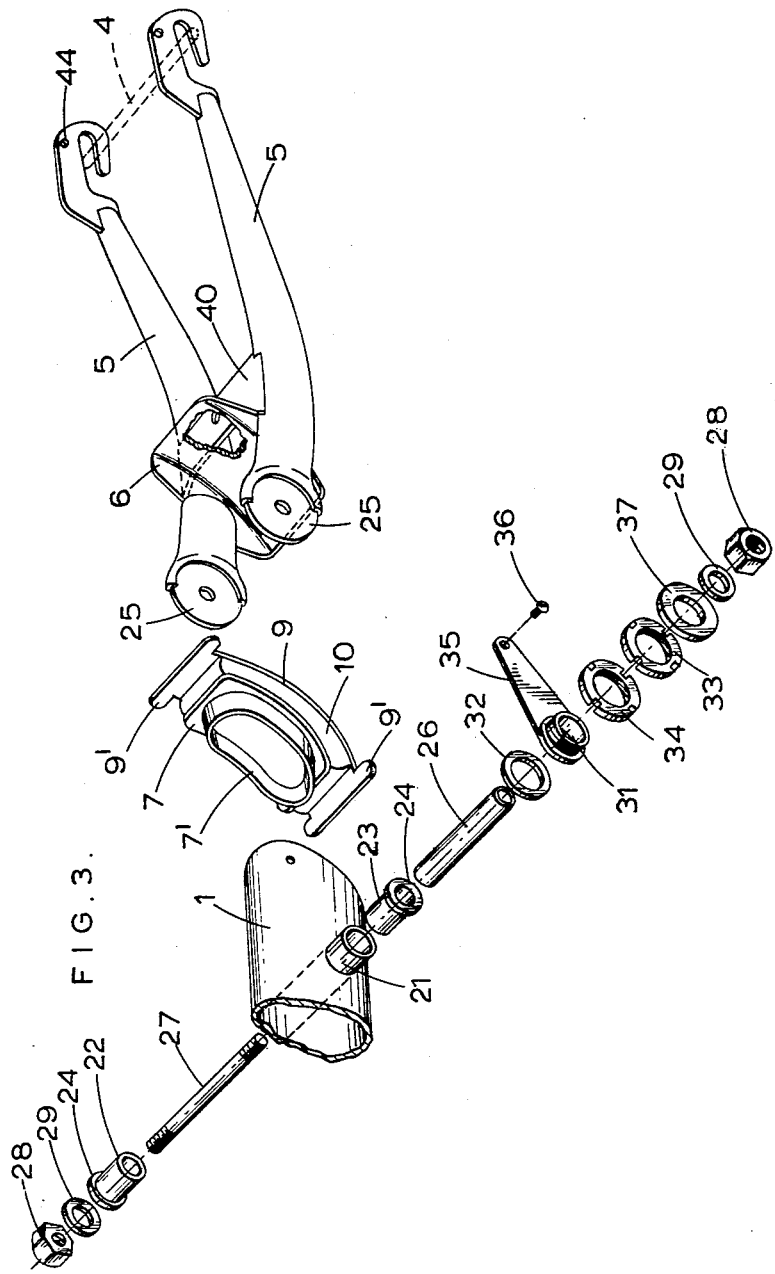

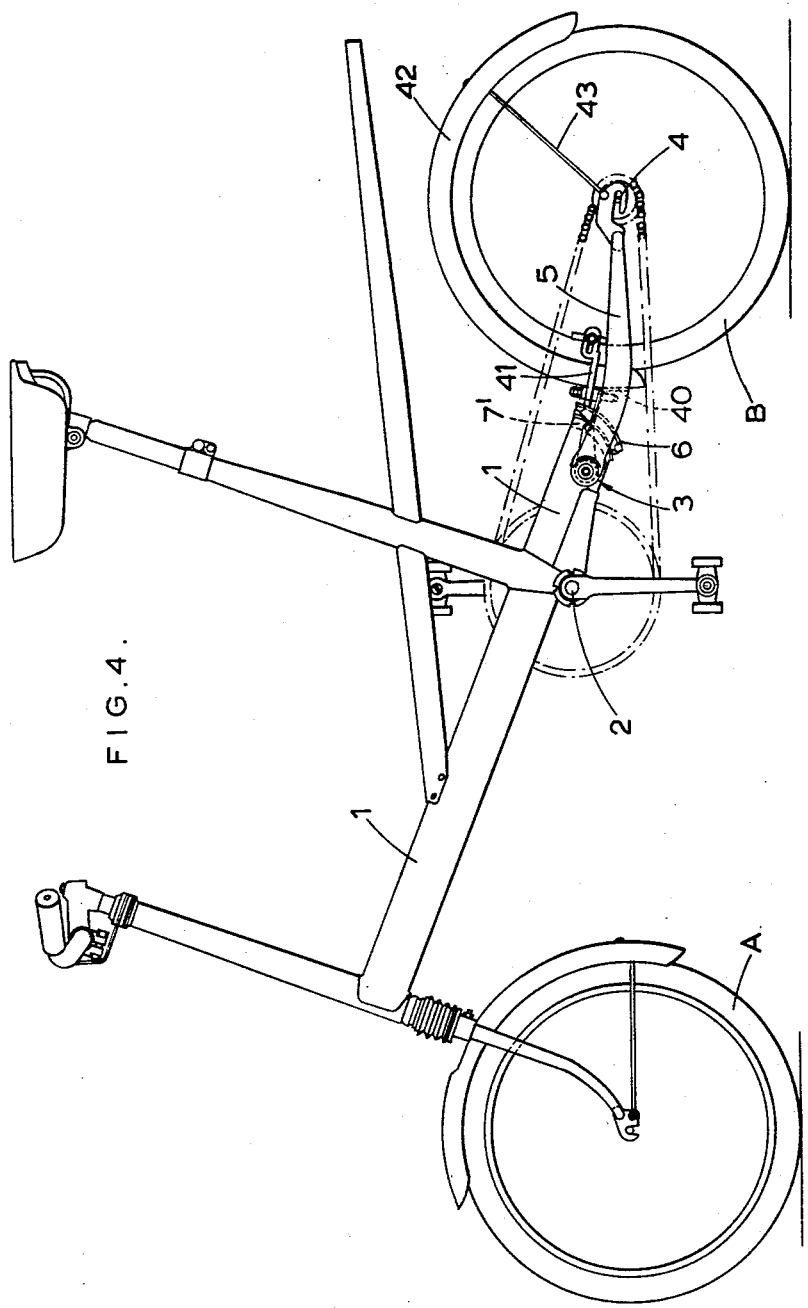

3,151,878
RESILIENT SUSPENSION FOR THE REAR WHEEL
OF A TWO-WHEELED CYCLE VEHICLE
Philip Basil Uncles, Bradford-on-Avon, England, assignor to Moulton Consultants Limited, Wiltshire, England, a British company
Filed Jan. 9, 1963, Ser. No. 250,276
Claims priority, application Great Britain, Jan. 12, 1962, 1,247/62
10 Claims. (Cl. 280—284)

This invention relates to vehicle wheel suspensions more particularly for the rear wheels of two wheeled vehicles, such as pedal driven bicycles, motorised bicycles, motor scooters and motor cycles.

According to the present invention, the spindle of the rear wheel of a two wheeled cycle vehicle is carried on the rear end of a trailing arm structure whose forward end is pivotally mounted on a transverse pivot bearing carried by the frame of the vehicle on an axis parallel to that of the spindle, there being provided in line between said bearing and the rear wheel spindle, spring means operating between the trailing arm structure and the frame and serving resiliently to control pivotal movement of the structure relative to the frame.

Preferably, according to the invention, the trailing arm structure comprises a pair of arms, which are suitably tubular, one at either side of the wheel, each arm being pivotally mounted at its forward end on the vehicle frame by the transverse bearing and extending rearwardly therefrom to mount the rear wheel spindle. At a point ahead of the wheel the arms are rigidly connected together by a transverse bridge bracket member and the frame of the vehicle is formed with an abutment located just ahead of this bridge bracket member, while in the space between the abutment and the bridge bracket member is rubber-bonded-to-metal sandwich spring.

The transverse bearing is arranged with its axis parallel to the axis of the rear wheel spindle and, where the wheel is chain driven, is located substantially in line between the spindle and the axis of the chain drive wheel thus avoiding undesirable changes in chain tension during articulation of the wheel suspension.

Preferably also the abutment on the frame which lies in rear of the transverse bearing comprises a plate which is curved about a substantially transverse axis forward of the plate above and parallel with the transverse bearing. Where the frame member carrying the abutment is a tube end, the curved plate forming the abutment will be made as a cap fitting over or in the end of the tube.

The bridge member of the trailing arm structure will also be formed with an abutment face, having a curvature about an axis located near to or identical with the axis of curvature of the abutment member of the frame.

Fitted between the abutment face formed on the frame and the abutment face of the bridge member of the trailing arm structure is a generally rectangular rubber pad which is also curved in part cylindrical form about an axis parallel to, but disposed above the transverse pivot bearing. Preferably the pad at its front side is bonded to the curved abutment face formed on or attached to the frame while the opposite side of the pad will be bonded to an intermediate curved plate which in turn will be attached to the bridge member of the trailing arm structure. In any case the rubber pad will operate in shear as a rubber-to-metal bonded sandwich spring which is deflected between the abutments on the frame and on the arm structure during articulation of the structure about the bearing. Moreover, due to the axis of curvature of the abutment plates between which the spring is bonded, being above the transverse bearing, the spring will during upward movement of the wheel in relation to the frame be resiliently deformed in compression while during rebound the rubber will be deformed in shear and slight tension. By these means upward pivotal movement of the suspension arm structure will be progressively and increasingly resisted by the spring means, i.e. a rising rate is achieved.

The bridge member connecting the twin trailing arms may provide a mounting member for a caliper type rim brake assembly carried either above or below the trailing arm structure.

A friction damper device may be provided suitably associated with the transverse bearing. In a preferred form the friction damper comprises an arm member fixed to the vehicle frame and engaged frictionally with the trailing arm structure during articulation of the wheel suspension.

A preferred embodiment of the invention is illustrated by way of example in the accompanying drawings in which, FIGURE 1 is a schematic side elevation of rear wheel suspension means for a bicycle, while FIGURE 2 is a cross-sectional plan view taken on the lines II—II of FIGURE 1.

FIGURE 3 is an exploded view showing in perspective the components of the suspension means.

FIGURE 4 is a side elevational view of a pedal bicycle provided with rear wheel suspension means according to the invention.

In the drawings, 1 is a tubular frame member extending rearwardly from the front wheel A of the machine and terminating at a point just ahead of the rear wheel B. Pivot bearing means generally designated 3 are carried transversely of the frame 1, on an axis parallel to that of the rear wheel spindle 4. A pair of trailing arms 5 of tubular construction are pivotally mounted on the pivot bearing means 3 and extend rearwardly therefrom on either side of the wheel 2 to mount the spindle in known manner.

At a point just ahead of the rear wheel B the arms 5 are rigidly connected together by a transverse bridge member 6 to form a trailing arm structure. The member 6 forms a rear abutment for spring means as will be described below.

Ahead of the rear abutment 6 the frame 1 is formed with an abutment 7 which in this example is formed as a cap closing the end of the tubular frame member 1, and having a spigot portion 7' fitting in the open end of the frame member. The abutment 7 constitutes the front abutment for the spring means.

The front and rear abutments are both curved in part cylindrical form about an axis 8 (in FIGURE 1) which is an imaginary line lying transversely of the machine parallel to, but located some distance above, the bearing 3.

Preferably the distance between the transverse axis 8 and the axis of the pivot bearing means 3 is equal to substantially one half the radius of the cylindrical surface of the front abutment 7.

A generally rectangular pad of rubber 10, which is also curved in part cylindrical form about the axis 8, is arranged between the abutments 6 and 7. In the particular embodiment shown, one face of the rubber pad is bonded to the face of the cap constituting the abutment 7, while the opposite face of the pad is bonded to an intermediate plate 9, which, by means of bent over ears 9', is fixable to the abutment 6. The pad 10 thus constitutes a rubber-bonded-to-metal sandwich spring which is deflected between the abutments 6 and 7 during pivotal movement of the arms 5 about the bearing means 3.

Due to the displacement of the axis of curvature 8 above the bearing means 3, during upward pivotal movement of the arms 5, the rubber spring is deflected in both compression and shear between the abutments 6 and 7. Due to the compression factor the wheel suspension is endowed with a rising rate. On downward pivotal movement of the arms 5, the rubber spring will be deflected in tension and in shear.

Due to the effect known as "hysteresis" in the rubber pad 10 on deflection, the suspension is endowed with some degree of damping. In order to provide the suspension with additional damping, as will be hereafter described, the bearing means 3 is provided with friction damper means whereby pivotal movement of the trailing arms structure is frictionally resisted.

The rubber pad 10 is disposed substantially in line between the bearing means 3 and the spindle 4 during all movements of the suspension thus effecting economy of space in conjunction with an efficient resilient suspension for the rear wheel. The pivot bearing means 3 will be substantially in line between the rear wheel spindle 4 and the chain wheel axle 2, where the vehicle is chain driven, thus avoiding undesirable excessive variation in chain tension during the articulation of the wheel suspension.

Referring now more particularly to FIGURE 2 where the pivot bearing means and the friction damper means are shown in greater detail, 21 represents a tube fixed transversely within the section of the vehicle frame member 1. A pair of bearing sleeves 22 and 23 are an interference fit within the sleeve 21 and are each provided with end flanges 24 limiting their inward movement.

At the leading end of each arm 5 is an apertured lug 25 bearing against the respective ends of a spacer tube 26. A bolt 27 is passed through the apertures in the lugs 25 and through the spacer tube 26, while nuts 28 on the threaded ends of the bolt can be tightened to lock the lugs 25 against rotation relative to the spacer tube 26, which latter is a revolving fit within the bearing sleeves 22 and 23. Washers 29 are provided for the nuts 28.

An externally threaded sleeve 31 is located surrounding one of the protruding ends of the fixed tube 21 and spaced from the frame member 1 by a spring washer 32. This sleeve 31 has a stator arm 35 whose end is fixed to the frame member 1 (by a screw 36, as shown in FIGURES 1 and 3) to hold the sleeve 31 against rotation.

Threaded externally on the sleeve 31 are a pair of nut members 33 and 34, while a friction washer 37 is interposed between the nut 33 and the adjacent lug 25 of the arm structure 5. The washer 37 can be brought into frictional engagement with the adjacent lug 25 by rotation of the nut 33, whereupon the nut 34 can be tightened against the nut 33 to lock both nuts against rotation relative to the sleeve 31, which in turn as stated above is held against rotation relative to the frame member 1. By these means pivotal movement of the arms 5 will be frictionally resisted.

FIGURE 3 illustrates in exploded view the components above referred to with reference to FIGURE 2, and further it will be seen that the arms 5 are provided with a bracket 40 in rear of the abutment 6, for the purpose of providing a mounting base for a caliper brake assembly as shown at 41 in FIGURE 4. The bracket 40 also mounts the leading end of a mud guard 42 having stays 43 anchored at their lower ends to eyes 44 at the rearward ends of the arms 5.

I claim:

1. Suspension means for the rear wheel of a two-wheeled cycle vehicle including a frame, a trailing arm structure pivotally mounted at one of its ends on a transverse pivot bearing means disposed on the vehicle frame, said arm structure extending rearwardly from the pivot bearing means and including means at its other end for mounting a rear wheel spindle, spring means comprising a rigid rear abutment and a rigid front abutment each having spaced opposing part cylindrical surfaces curved co-axially about a transverse axis parallel to and disposed above the axis of said transverse pivot bearing means, an arcuate rubber member extending between and bonded to said surfaces, and connecting means rigidly securing said front, and rear abutments to said vehicle frame and to said arm structure respectively so that said abutments are located between the ends of said arm structure, said rubber member on upward pivotal movement of said arm structure being deflected both in compression and shear.

2. Suspension means according to claim 1 wherein the arm structure comprises a pair of arms extending rearwardly from the pivot bearing means, one at each side of the rear wheel to mount the respective ends of the rear wheel spindle, a transverse bracket member extending between and connecting said arms forwardly of said rear wheel, said abutments extending between said arms and said rear abutment being rigidly fixed directly to said bracket member.

3. Suspension means as defined in claim 2 wherein said abutments are composed of metal plates and said cylindrical surfaces are spaced apart a distance equal to only a minor fraction of the radii of said cylindrical surfaces.

4. Suspension means as defined in claim 3 wherein the distance between said transverse axis and the axis of said transverse pivot bearing means is equal to substantially one half the radius of said cylindrical surface of said front abutment, and said transverse axis is directly above the axis of said transverse pivot bearing means.

5. Suspension means as defined in claim 2 wherein said frame includes a lower member having a recess in its rear end, said front abutment including a projection telescopically and slidably fitting within said recess.

6. Suspension means as defined in claim 2, wherein said transverse bearing means includes a sleeve fixed to said frame and extending between said arms, a spindle connecting said arms together and journaled in said sleeve, a friction member co-axially slidably mounted on one end of said sleeve, spring means urging said friction member into frictional engagement with one of said arms, and means connected to said friction member so as to prevent its rotation on said sleeve.

7. Suspension means as defined in claim 2 including a chain sprocket journaled on said frame, said transverse pivot bearing means located in alignment with the axis of said chain sprocket and said rear wheel spindle.

8. Suspension means according to claim 1 including friction damper means forming part of the pivot bearing means and arranged to engage between means fixed to the frame and said arm structure for the purpose of frictionally resisting pivotal movement of the arm structure.

9. Suspension means according to claim 8, wherein the friction damper means includes locknut means disposed about the pivot bearing means and at least one friction washer arranged between the locknut means and a part of the arm structure journalled on said pivot bearing means, said locknut means being adjustable to clamp the washer against the arm structure and said locknut means being lockable against rotation relative to the vehicle frame.

10. Suspension means according to claim 9 wherein the locknut means comprise a pair of nuts threaded externally on a sleeve member formed with an integral stator arm clamped to the vehicle frame.

References Cited in the file of this patent

UNITED STATES PATENTS

| | | |
|---|---|---|
| 2,147,518 | Boxan | Feb. 14, 1939 |
| 2,231,037 | Taylor | Feb. 11, 1941 |
| 2,756,070 | Torre | July 24, 1956 |
| 2,872,207 | Hirst | Feb. 3, 1959 |
| 3,083,039 | Moulton | Mar. 26, 1963 |

FOREIGN PATENTS

| | | |
|---|---|---|
| 91,523 | Norway | Feb. 22, 1958 |